Patented Apr. 22, 1924.

1,491,465

UNITED STATES PATENT OFFICE.

AUGUSTUS E. CRAVER, OF CLIFFSIDE, NEW JERSEY, ASSIGNOR TO THE BARRETT COMPANY, A CORPORATION OF NEW JERSEY.

PRODUCTION OF SUCCINIC ACID.

No Drawing.  Application filed January 20, 1922. Serial No. 530,684.

*To all whom it may concern:*

Be it known that I, AUGUSTUS E. CRAVER, a citizen of the United States, residing at Cliffside, in the county of Bergen and State of New Jersey, have invented certain new and useful Improvements in Production of Succinic Acid, of which the following is a specification.

This invention relates to an improved process for the commercial production of succinic acid. It relates more specifically to the reduction of maleic or fumaric acid in the form of its salts to form succinic acid by means of hydrogen in the presence of a metallic catalyst.

Previously described processes for the production of succinic acid have been the distillation of amber, the hydrolysis of ethylene cyanide by means of mineral acids or alkalies, the oxidation of fats by means of nitric acid, the oxidation of glutamic acid or aspartic acid by means of hydrogen peroxide, the schizomycetic fermentation of malic acid and tartaric acid, the reduction of acetylene dicarboxylic acid with sodium amalgam, the reduction of maleic and fumaric acid by sodium amalgam and other processes of a similar nature. All of these above mentioned processes, however, possess certain disadvantages when an attempt is made to produce succinic acid in commerical quantities, among which are low yields, costly and commercially unavailable starting materials, slowness of reaction, complicated reactions which are difficult to control and which give rise to side products, and the difficulty of obtaining pure succinic acid from the reaction products.

I am also aware that succinic acid has been produced by the reduction of either sodium fumarate or maleate by employing a colloidal solution of palladium hydride in the presence of hydrogen, as described in Berichte der deutschen Chemischen Gesellschaft, volume 41, pages 2273-2277. There are, however, very serious disadvantages in the commercial production of succinic acid by this method, namely the great cost of palladium and the necessity of preparing a fresh palladium hydride hydrosol for every reduction, since on the acidulation of the sodium succinate to liberate the succinic acid, the palladium hydride hydrosol is decomposed, with the precipitation of the palladium hydrosol and also a part of the protective colloid. Since succinic acid is also precipitated in this acidulation, it must be separated and purified, which fact is an additional disadvantage of this process.

The following description of my process will make clear the improvement which I have effected in the commercial production of succinic acid over the previous processes.

I have found that succinic acid can be produced cheaply, and in practically quantitative yields by treating either maleic or fumaric acid in the form of its salts with hydrogen in the presence of nickel or similar base metal used as a catalyst and subsequently recovering succinic acid from its salts.

My invention will be best understood by giving a specific example, but it will be understood that this is for the purpose of illustration only, and that the process can be varied in its details over wide limits without departing from the spirit or scope of the invention.

120 parts by weight of maleic acid are dissolved in 450 parts of water containing 82.8 parts of sodium hydroxide, which solution is then transferred to a closed system, followed by the addition of 40 parts of nickel catalyst consisting of 75% of asbestos and 25% of nickel calculated as the metal. A very satisfactory catalyst for this reduction may be prepared by adding enough hot water to 30 parts of moderately long fibered acid washed asbestos and 50 parts of pure nickel nitrate to give a thin "mush," after which 24 parts of pure sodium carbonate are thoroughly stirred in. The mass is then filtered and washed with hot water until free of soluble material, after which it is finally dried at 100° C. After disintegrating this dried mass, it is placed in a closed vessel and heated at 360° C. for 1.5 hours with a stream of air passing through. Following this preliminary air treatment, hydrogen is passed through the catalyst while maintained at a temperature of 390–400° C. for a period of two hours, after which it is allowed to cool to room temperature in the presence of hydrogen. The catalyst is now ready for use. The catalyst is then transferred to the vessel containing the solution to be reduced and hydrogen is then passed thru while the mass is maintained at room or slightly higher temperature until the air has all been displaced. The vessel is then closed to the air, and with the hydrogen supply maintained, the agitation of the mass is begun and continued until the reduction of the maleic acid has been completed, which is ascertained either by noting the change in the hydrogen pressure in the vessel when the latter is cut off from the hydrogen supply, a diminution of the hydrogen pressure obviously indicating incomplete reduction, or by removing a sample of the liquid and testing for maleic acid. After the reduction has been finished, the solution of sodium succinate is removed from the catalyst by a filtering device placed inside the vessel, which permits the retention of catalyst inside thereof, thus enabling it to be reused. This solution is then concentrated in vacuo until about 150 parts of water have been evaporated, after which it is heated to 80° C. and 204 parts of concentrated hydrochloric acid (37%) are added gradually. The mass is then cooled to 0° C. and the succinic acid, which thereby separates, is filtered washed with 250 parts of ice water and dried. About 87–90% of the succinic acid present can thus be obtained by this concentration and if the filtrate is again concentrated to a volume just sufficient to maintain the remaining succinic acid in solution at near the boiling point and the separated sodium chloride filtered, an additional amount of succinic acid can be separated by cooling to 0° C. Another repetition of this concentration filtration of the sodium chloride and succinic acid from the second mother liquid will give additional succinic acid, and a total acid recovery of practically 100%. The rate of reduction of the sodium maleate is more or less directly proportional to the hydrogen pressure employed within, of course, certain limits, and I have found that under the above conditions, using two and a half atmospheres of absolute pressure, an hourly production of fifteen parts of succinic acid can be realized. The reduction of the maleic acid to succinic acid has been found to be quantitative and no side reactions have been observed.

If a good grade of maleic acid is employed, the succinic acid obtained is of a very high degree of purity and requires no further purification.

I have also found that fumaric acid can be reduced to succinic acid by employing exactly the same procedure as just described, except that weaker solutions of sodium fumarate must be employed owing to the decreased solubility of sodium fumarate in water when compared to that of sodium maleate.

The advantages of my process over the previously described processes are very obvious, as for example, the reaction is rapid and complete, there are no disturbing side reactions, no purification of the resulting succinic acid is necessary, the reaction is simple and easy to control, the catalytic material is cheap, easily prepared, and can be used repeatedly in the reductions without requiring the charging of fresh catalyst, a relatively small amount of apparatus is necessary, and the cost of the materials is low.

Although I have given an example of the manner in which my invention may be practiced, it is evident that the various conditions and procedures are capable of wide variation, as for example, a gas containing hydrogen may be used instead of hydrogen itself, other salts of maleic and fumaric acids may be used, such as the potassium, ammonium and calcium salts, and instead of employing water as the solvent, other materials can be employed, such as alcohol, acetone as such or admixed with water, it is also possible to have the maleic or fumaric acid material in an emulsified form, and it is, of course, recognized, that any means which will tend to increase the solubility of the hydrogen in the liquid will be of benefit. Instead of employing nickel as the catalyst, cobalt or copper may be used as well as mixtures of either one or both of the metals and nickel. The choice of the carrier, other than asbestos, is wide, including, for example, such materials as infusorial earth, fuller's earth, crushed pumice or other suitable powdered, granulated or fibrous material which is chemically inactive and acts merely as a mechanical distributor. My work has shown that the use of a carrier is decidedly preferable over the use of the metal alone. A variety exists in the choice of the conditions of the ignition of the nickel catalyst, but I have found that much below the stated temperature of 390–400° C. the catalyst is somewhat more active but is much more sensitive to deterioration influences, while at temperatures much above this range, the catalytic activity is much reduced. The recovery of the succinic acid after reduction can be widely varied from the procedure given, depending to some extent on the maleic or fumaric acid salts used. Although the reaction works exceedingly efficiently at room temperatures, increased temperature may be employed, but this is not especially recommended as it tends to decrease the solubility of the hydrogen in the liquid, and as stated previously, pressures considerably above atmospheric are advantageous.

It will be evident also that various types of apparatus may be used for carrying out the process of the present invention and for bringing about the necessary contact of the solution with the hydrogen and catalyst. Any apparatus selected should be tight and should provide the maximum of agitation of the contents thereof. It should also be so equipped that the reacted solution can be easily drawn off, leaving the catalyst inside in a condition suitable for reusing. In my work, I have found that the catalyst prepared as described can be used repeatedly without showing marked depreciation.

The term "maleic acid" is intended to include pure maleic acid or the maleic acid solutions as obtained in the partial oxidation of benzene as described in U. S. Patent No. 1,318,633, which solutions are produced by allowing the oxidation products of benzene, including maleic anhydride and traces of benzoquinone and formaldehyde, to bubble through water. The term "fumaric acid" is also intended to include pure fumaric acid and also crude fumaric acid. As it is well known, fumaric acid readily results on treating maleic acid with mineral acids or by heating with water under pressure, in which latter reaction some malic acid also results, but which can be easily separated from the fumaric acid.

In the claims when succinic acid is mentioned, it is my intention to include either free succinic acid or succinic acid in the form of one of its salts.

I claim:—

1. The process of producing succinic acid, which comprises treating a compound containing an acid radical of the formula $C_2H_2(CO_2)_2$ with a hydrogen-containing gas in the presence of a base metal.

2. The process of producing succinic acid, which comprises treating a salt of the formula $C_2H_2(COOM)_2$, in which M is a metal, with a hydrogen-containing gas in the presence of a base metal.

3. The process of producing succinic acid, which comprises treating a salt of maleic acid with a hydrogen-containing gas in the presence of a base metal.

4. The process of producing succinic acid, which comprises treating an alkali salt of maleic acid with a hydrogen-containing gas in the presence of a base metal.

5. The process of producing succinic acid, which comprises treating a sodium salt of maleic acid with a hydrogen-containing gas in the presence of a base metal.

6. The process of producing succinic acid, which comprises treating a compound containing an acid radical of the formula $C_2H_2(CO_2)_2$ with hydrogen in the presence of a base metal.

7. The process of producing succinic acid, which comprises treating a salt of maleic acid with hydrogen in the presence of a base metal.

8. The process of producing succinic acid, which comprises treating a compound containing an acid radical of the formula $C_2H_2(CO_2)_2$ with a hydrogen containing gas in the presence of nickel.

9. The process of producing succinic acid, which comprises treating a salt of maleic acid with a hydrogen-containing gas in the presence of nickel.

10. The process of producing succinic acid, which comprises treating a sodium salt of maleic acid with hydrogen in the presence of nickel.

11. The process of producing succinic acid, which comprises treating a salt of fumaric acid with a hydrogen-containing gas in the presence of a base metal.

12. The process of producing succinic acid, which comprises treating a salt of fumaric acid with a hydrogen-containing gas in the presence of nickel.

13. The process of producing succinic acid, which comprises treating a sodium salt of maleic acid with hydrogen in the presence of nickel at a pressure of approximately 2½ atmospheres.

In testimony whereof I affix my signature.

AUGUSTUS E. CRAVER.